T. E. MURRAY & A. W. H. GRIEPE.
DEVICE FOR INDICATING CONDITION OF GAS IN REFRIGERATING APPARATUS.
APPLICATION FILED NOV. 8, 1912.

1,103,985.

Patented July 21, 1914.

UNITED STATES PATENT OFFICE.

THOMAS E. MURRAY AND AUGUST W. H. GRIEPE, OF NEW YORK, N. Y.; SAID GRIEPE ASSIGNOR TO SAID MURRAY.

DEVICE FOR INDICATING CONDITION OF GAS IN REFRIGERATING APPARATUS.

1,103,985.   Specification of Letters Patent.   Patented July 21, 1914.

Application filed November 8, 1912.   Serial No. 730,138.

*To all whom it may concern:*

Be it known that we, THOMAS E. MURRAY and AUGUST W. H. GRIEPE, citizens of the United States, residing at New York, in the county of New York and State of New York, have invented a certain new and useful Improvement in Devices for Indicating Condition of Gas in Refrigerating Apparatus, of which the following is a specification.

In ice-making and refrigerating apparatus operating on the compression cycle principle, wherein gas is condensed to a liquid which is afterward expanded in the cooling coils, it frequently happens that the gas becomes weakened or adulterated by atmospheric air containing moisture, and hence less efficacious in operation.

Our present device is a trap wherein the moisture contained in the gas is not only collected and prevented from returning to the system, but said moisture acts upon a body of absorbent material disposed in said trap to change the color thereof. This change is at once visible through the transparent wall of the trap, and serves to indicate the condition of the gas to the attendant.

Figure 1:
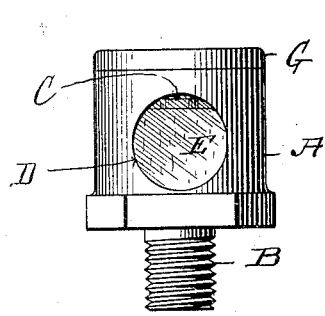
Figure 2:
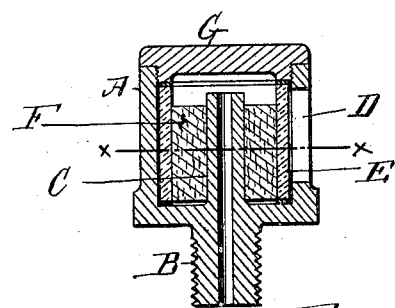
Figure 3:
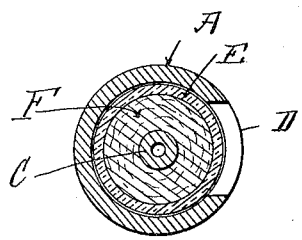

In the accompanying drawings—Figure 1 is an elevation, and Fig. 2 is a vertical section of our device. Fig. 3 is a cross section on the line $x, x$ of Fig. 2.

Similar letters of reference indicate like parts.

A is a metal cup, having a threaded tubular external projection B to enter the gas conduit (not shown) and an internal tubular projection C. In the wall of cup A is a sight-opening D. Within said cup is a section E of glass tubing, forming a lining and closing the opening D. Also within said cup and filling the space between glass lining E and internal projection C is an annular body F of paper or other suitable absorbent material. Above the body F is a threaded cover G.

The body F is dyed with a material which undergoes a marked change of color when subjected to the action of the gas employed when said gas is of a predetermined working strength, but which undergoes less change when acted upon by said gas when in adulterated or weakened condition. Thus, for example, in a system in which the refrigerating volatilizable liquid is sulfur dioxid, the body F may be dyed with a litmus solution. Such a solution, when subjected to the strong gas due to volatilization of sulfur dioxid, becomes blue; but if the gas becomes weakened or adulterated by atmospheric air containing moisture, the color will be purple and more incline to red as the weakening or adulteration of said gas increases.

The need of admission of a fresh supply of strong gas free from moisture is thus indicated. The moisture in the tested gas becomes trapped at the bottom of the cup A, and is thus prevented from returning to the system.

We claim:

A cylindrical receptacle constructed to trap moisture, having a sight-opening in its wall, a cylindrical lining of transparent material forming a closure for said opening, means for conveying a gas charged with moisture into said receptacle, and a body of material adapted to change color when subjected to the action of moisture disposed in said receptacle.

In testimony whereof we have affixed our signatures in presence of two witnesses.

THOMAS E. MURRAY.
AUGUST W. H. GRIEPE.

Witnesses:
    GERTRUDE T. PORTER,
    MAY T. MCGARRY.